US011880216B2

(12) United States Patent
Ankamreddi et al.

(10) Patent No.: US 11,880,216 B2
(45) Date of Patent: *Jan. 23, 2024

(54) CIRCUIT AND METHOD FOR MITIGATING TRANSIENT EFFECTS IN A VOLTAGE REGULATOR

(71) Applicant: TEXAS INSTRUMENTS INCORPORATED, Dallas, TX (US)

(72) Inventors: Ramakrishna Ankamreddi, Bangalore (IN); Isha Agrawal, Bangalore (IN); Rohit Phogat, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/181,629

(22) Filed: Mar. 10, 2023

(65) Prior Publication Data

US 2023/0213956 A1 Jul. 6, 2023

Related U.S. Application Data

(62) Division of application No. 17/363,729, filed on Jun. 30, 2021, now Pat. No. 11,630,472.

(60) Provisional application No. 63/125,863, filed on Dec. 15, 2020.

(51) Int. Cl.
*G05F 1/575* (2006.01)
*G05F 1/56* (2006.01)

(52) U.S. Cl.
CPC ................ *G05F 1/575* (2013.01); *G05F 1/56* (2013.01)

(58) Field of Classification Search
CPC .................................. G05F 1/575; G05F 1/56
See application file for complete search history.

(56) References Cited

U.S. PATENT DOCUMENTS

| | | | |
|---|---|---|---|
| 6,603,292 | B1 | 8/2003 | Schouten et al. |
| 6,690,147 | B2 | 2/2004 | Bonto |
| 7,166,991 | B2 | 1/2007 | Eberlein |
| 8,115,463 | B2 | 2/2012 | Wang |
| 8,344,713 | B2 | 1/2013 | Shrivas et al. |
| 8,716,993 | B2 | 5/2014 | Kadanka |
| 8,816,658 | B1 | 8/2014 | De Vita |
| 8,884,655 | B2 | 11/2014 | Mukherjee |
| 9,122,293 | B2 | 9/2015 | Price et al. |
| 9,323,259 | B2 | 4/2016 | Chou et al. |

(Continued)

FOREIGN PATENT DOCUMENTS

WO WO-2018129967 A1 7/2018

*Primary Examiner* — Sisay G Tiku
(74) *Attorney, Agent, or Firm* — Ray A. King; Frank D. Cimino

(57) ABSTRACT

Described embodiments include a voltage regulator circuit comprising an output voltage terminal configured to be coupled to a load that draws a load current, first and second amplifiers, and first, second, third, fourth and fifth transistors. The embodiment also includes a dynamic R-C network coupled between the third amplifier input and the seventh transistor current terminal, wherein the dynamic R-C network includes capacitors and MOS-based resistors, a third amplifier having a fourth amplifier input and a third amplifier output, wherein the fourth amplifier input is coupled to the output voltage terminal, and a capacitor that is coupled between the output voltage terminal and the fourth amplifier input.

20 Claims, 4 Drawing Sheets

(56) References Cited

U.S. PATENT DOCUMENTS

| | | | | |
|---|---|---|---|---|
| 9,684,325 | B1 | 6/2017 | Rasmus | |
| 10,133,289 | B1 | 11/2018 | Ankamreddi | |
| 10,498,333 | B1 | 12/2019 | Ankamreddi | |
| 10,802,521 | B2 | 10/2020 | Qiu | |
| 2012/0262135 | A1 | 10/2012 | Childs | |
| 2013/0147448 | A1 | 6/2013 | Kadanka | |
| 2015/0220096 | A1* | 8/2015 | Luff | G02F 1/1368<br>323/273 |
| 2017/0090494 | A1 | 3/2017 | Cui | |
| 2019/0020338 | A1 | 1/2019 | Chellamuthu et al. | |
| 2019/0258282 | A1 | 8/2019 | Magoo | |
| 2021/0149427 | A1 | 5/2021 | Moctezuma | |
| 2021/0191438 | A1 | 6/2021 | Phogat | |
| 2021/0194346 | A1 | 6/2021 | Phogat | |
| 2021/0216094 | A1 | 7/2021 | Ankamreddi | |
| 2022/0147085 | A1 | 5/2022 | Hsu | |
| 2023/0006536 | A1* | 1/2023 | Rai | H02M 1/143 |

* cited by examiner

CIRCUIT AND METHOD FOR MITIGATING TRANSIENT EFFECTS IN A VOLTAGE REGULATOR

CROSS-REFERENCE TO RELATED APPLICATION

This application is a division of U.S. patent application Ser. No. 17/363,729 filed Jun. 30, 2021, which claims priority to U.S. Provisional Patent Application No. 63/125,863 filed Dec. 15, 2020 and India Patent Application No. 201941052912 filed Dec. 19, 2019, all of which are incorporated herein by reference.

BACKGROUND

This description relates to voltage regulators, and particularly low dropout regulators (LDOs). An LDO is a DC linear voltage regulator that can regulate its output voltage even when the input supply voltage is close to the output voltage. Performance characteristics generally considered desirable for an LDO are low quiescent current, fast transient response, low circuit noise, high power supply rejection ratio (PSRR) and low output capacitance.

Quiescent current (IQ) is the current drawn from the power supply by the LDO to control the LDO's internal circuitry. Most applications do not require the LDO to be in peak operation and supplying current to the load all of the time. While the LDO is in an idle state, the LDO draws a smaller amount of quiescent current than the LDO does when it is in a full load state. The quiescent current helps to keep the internal LDO circuitry operational and ready to supply higher current when a load is connected to the LDO. Quiescent current can be considered to be the difference between the input current to the LDO and the output current from the LDO.

The transient response of an LDO is the response of the output voltage from the LDO to a sudden load change from a no-load condition to a high load condition. In most cases, when an LDO suddenly goes from having no load on its output to having a higher load, the output voltage drops in response to the increased current demand of the load. The faster the LDO output voltage recovers and returns to its nominal value, the better the transient response of the LDO is. Having a larger capacitance on the output of the LDO can help to reduce the transient output voltage drop. However, larger capacitors require more printed circuit board area, and adds additional cost. So, having large output capacitors is not an attractive solution in many cases for suppressing voltage undershoot due to a load transient.

In general, two objectives that most LDO designers want to accomplish are the use of a smaller load capacitor in order to minimize the circuit area, and to have a lower IQ in order to achieve a higher power efficiency in the LDO. Unfortunately, each of these objectives can lead to a degraded transient response. There is a need for an LDO circuit that allows the use of a smaller load capacitor and draws a lower IQ while still achieving a good transient response on the output voltage.

SUMMARY

The first described embodiment presents a voltage regulator circuit comprising an output voltage terminal configured to be coupled to a load, a first amplifier having first and second amplifier inputs, a bias terminal and a first amplifier output. The first amplifier input is coupled to a voltage reference, and the second amplifier input is coupled to the output voltage terminal. There is a second amplifier having a third amplifier input and a second amplifier output, the third amplifier input being coupled to the first amplifier output, and there is a first transistor having first and second transistor current terminals and a first control terminal. The first transistor current terminal is coupled to a supply voltage terminal, and the first control terminal is coupled to the second amplifier output.

Additionally, the first embodiment includes a second transistor having third and fourth transistor current terminals and a second control terminal, the third transistor current terminal coupled to the supply voltage terminal, the second control terminal coupled to the first control terminal, and the fourth transistor current terminal coupled to the output voltage terminal. A third transistor has fifth and sixth transistor current terminals and a third control terminal, the fifth transistor current terminal and the third control terminal are coupled to the second transistor current terminal, and the sixth current terminal coupled to a ground terminal. A fourth transistor has seventh and eighth transistor current terminals and a fourth control terminal, the fourth control terminal coupled to the third control terminal, and the eighth transistor current terminal coupled to the ground terminal. A fifth transistor has ninth and tenth transistor current terminals and a fifth control terminal, the ninth current terminal coupled to the bias terminal of the first amplifier, the fifth control terminal is coupled to the third control terminal, and the tenth transistor current terminal is coupled to the ground terminal. The embodiment also includes a dynamic R-C network coupled between the third amplifier input and the seventh transistor current terminal, wherein the dynamic R-C network includes capacitors and MOS-based resistors, a third amplifier having a third amplifier output and a fourth amplifier input coupled to the output voltage terminal, and a capacitor coupled between the output voltage terminal and the fourth amplifier input.

A second example embodiment presents a method of improving transient response in a voltage regulator comprising providing a regulated voltage at an output voltage terminal under a no-load condition, connecting a load to the output voltage terminal, converting a decrease in voltage at the output voltage terminal to a current signal, then converting the current signal to a drive voltage with a dynamic impedance network that has a dynamic impedance controlled by a bias current provided to the dynamic impedance network. The method includes increasing a drive current sourced to the output voltage terminal by providing the drive voltage to a drive transistor, adaptively reducing the dynamic impedance as the voltage at the output voltage terminal increases, and boosting the dynamic impedance after the voltage at the output voltage terminal reaches a nominal value. The dynamic impedance is boosted by providing an offset current to the dynamic impedance network to reduce the bias current.

DETAILED DESCRIPTION

Figure 1:
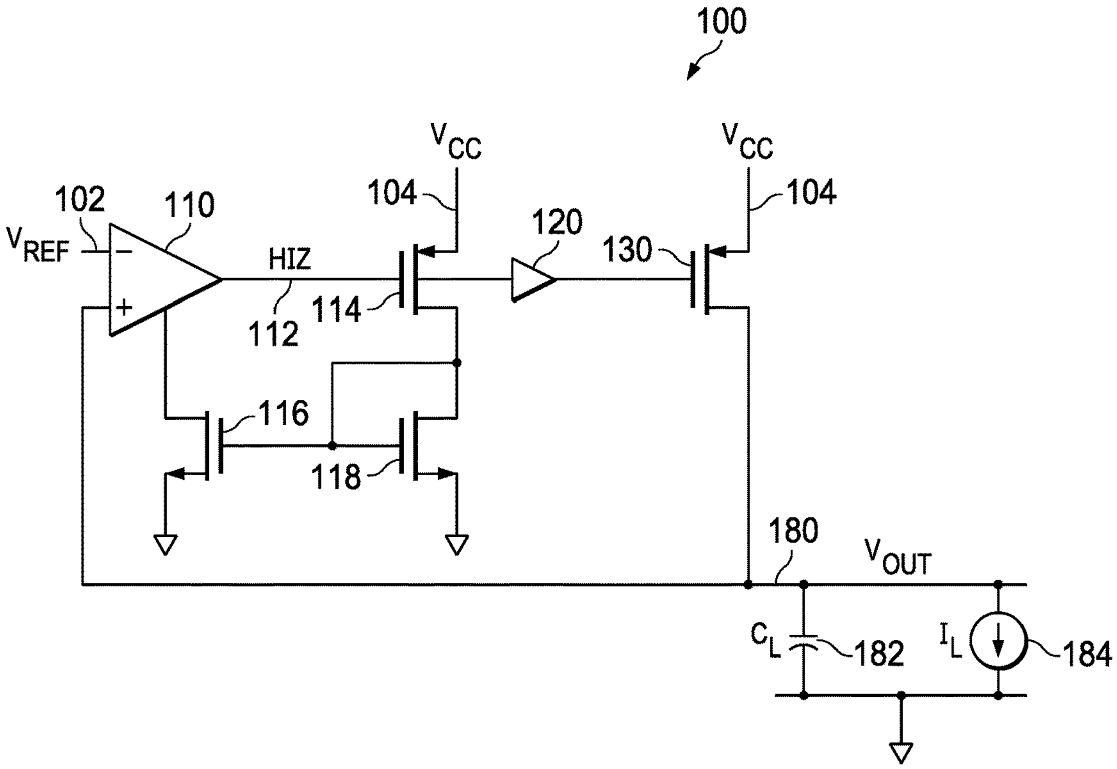
FIG. 1 shows a schematic diagram of an example control circuit for an LDO employing negative feedback.

In this description, the same reference numbers depict the same or similar (by function and/or structure) features. The drawings are not necessarily drawn to scale. FIG. 1 shows a control circuit 100 for an LDO employing negative feedback. Error amplifier 110 has first and second inputs and an output. The first input of error amplifier 110 receives a reference voltage $V_{REF}$ 102. In at least one example, $V_{REF}$ 102 is an internal voltage reference derived from a bandgap reference and a scaling amplifier. The second input of error amplifier 110 is coupled to the output terminal $V_{OUT}$ 180. The output of error amplifier 110 is high impedance node HIZ 112, which is coupled to the control terminal of transistor 114 and to the input of buffer amplifier 120.

The output of buffer amplifier 120 is coupled to the control terminal of transistor 130. A current terminal of transistor 114 and transistor 130 are each coupled to an input voltage supply terminal $V_{CC}$ 104. A second current terminal of transistor 130 is coupled to the output terminal $V_{OUT}$ 180. A load capacitor $C_L$ 182 and a current source load $I_L$ 184 are coupled between the output terminal $V_{OUT}$ 180 and ground. $I_L$ 184 could also be a resistor-based load that draws a current.

If the output current $I_L$ 184 is relatively small and a large load is suddenly connected to the output terminal $V_{OUT}$ 180, the voltage at $V_{OUT}$ 180 will immediately drop. The drop in the voltage at $V_{OUT}$ 180 will follow the relationship:

$$\Delta V_{OUT} = \frac{\Delta I_L}{C_L}\Delta t$$

where $\Delta V_{OUT}$ is the change in output voltage, $\Delta I_L$ is the change in the load current due to the transient condition, $C_L$ is the load capacitance, and $\Delta t$ is the amount of time over which the current change takes place.

Initially, current will be drawn from capacitor $C_L$ 182 to attempt to hold the output voltage at, or bring it back to, its nominal voltage. The larger that capacitor $C_L$ 182 is, the more current it can supply during a transient condition, and the faster the voltage at $V_{OUT}$ 180 can recover. However, a larger load capacitor increases the circuit area and can make the circuit more expensive, which is undesirable.

When the voltage at $V_{OUT}$ 180 drops below the value of reference voltage $V_{REF}$ 102, the output of error amplifier 110 will decrease in proportion to the difference in voltage between $V_{OUT}$ 180 and $V_{REF}$ 102. The decrease in voltage at the error amplifier output HIZ 112 will turn transistor 114 on proportionally harder. The error amplifier output HIZ 112 is also coupled to buffer amplifier 120. The output of buffer amplifier 120 is coupled to the control terminal of transistor 130. When transistor 130 turns on harder, more current flows through transistor 130, allowing the voltage at $V_{OUT}$ 180 to recover to its nominal value. However, when a fast no-load to full-load transient occurs, the main feedback loop is unable to correct the output voltage quickly due to initially low IQ.

The adaptive biasing loop formed by transistors 114, 116 and 118 combined with error amplifier 110 and buffer 120 can help to improve the transient response of the LDO. Transistors 114, 116, 118 and 130 can each be either a bipolar junction transistor or a field effect transistor (FET). As the voltage at $V_{OUT}$ 180 goes down, the voltage at HIZ 112 and the voltage at the control terminal of transistor 130 go down. This results in the current through transistor 130 increasing and the voltage at $V_{OUT}$ 180 recovering. Adaptive biasing systems sense the load current and increase IQ proportionally. If there is no load or only a small load, the IQ will be low. This helps to improve the power efficiency of the LDO during the no load condition. The IQ increases proportionally as the load current $I_L$184 increases. The output voltage $V_{OUT}$ begins to recover following a load transient as the current through transistor 130 increases with an increase in adaptive biasing, thus improving the transient response.

The transient response improves faster as the load current increases, thus reducing the voltage undershoot at $V_{OUT}$ more quickly while still maintaining an adequate power efficiency under light load conditions. However, there is an inherent delay that comes with adaptive biasing. This delay is due to a delay in the response of the loop formed by transistors 114, 116 and 118. Adaptive biasing can provide better noise and PSRR performance, but the adaptive biasing only engages after transistor 130 begins providing sufficient current. Accordingly, the adaptive biasing takes time to build up, and is unable to immediately respond to the transient output disturbance. The current from transistor 114 has to increase first, causing an inherent delay before IQ can be increased. So, while the system eventually becomes fast, there is a delay before reaching that fast stage that limits the improvement in the transient performance.

Figure 2:
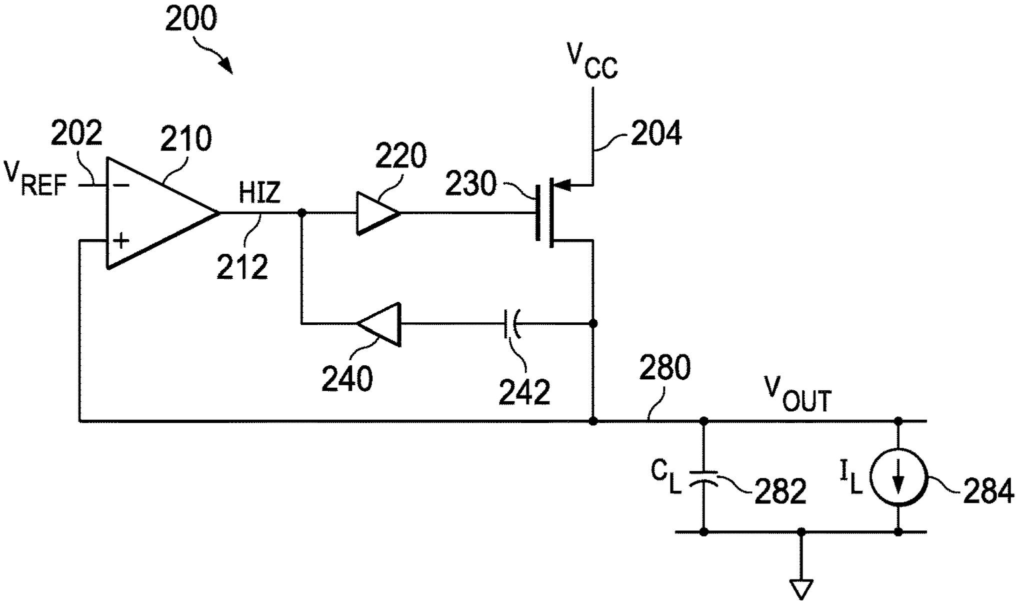
FIG. 2 shows a schematic diagram of an example circuit using capacitive coupling to create a fast loop to reduce the inherent delay before increasing IQ and mitigating the voltage drop at the output terminal due to a sudden load increase.

FIG. 2 shows an example 200 of using capacitive coupling to create a fast loop to reduce the inherent delay before increasing IQ and mitigating the voltage drop at output terminal $V_{OUT}$ 280 following a sudden load increase. Error amplifier 210 has first and second inputs and has an output. The first input of error amplifier 210 receives a reference voltage $V_{REF}$ 202. The second input of error amplifier 210 is coupled to the output terminal $V_{OUT}$ 280. The output of error amplifier 210 is high impedance node HIZ 212, which is coupled to the input of buffer amplifier 220.

The output of buffer amplifier 220 is coupled to the control terminal of transistor 230. The current terminals of transistor 230 are coupled between voltage supply terminal $V_{CC}$ 204 and the output terminal $V_{OUT}$ 280. A load capacitor $C_L$ 282 and a load current source $I_L$ 284 are coupled between the output terminal $V_{OUT}$ 280 and ground.

A fast loop is created by capacitor 242 and current buffer amplifier 240. Capacitor 242 is coupled between the output terminal $V_{OUT}$ 280 and the input of current buffer amplifier 240. The output of current buffer amplifier 240 is coupled to the input of buffer amplifier 220. Buffer amplifier 220 and transistor 230 combine with capacitor 242 and current buffer amplifier 240 to complete the closed fast loop.

If the output current $I_L$ 284 is relatively small, and a large load is then suddenly connected to the output terminal $V_{OUT}$ 280, the voltage at $V_{OUT}$ 280 will immediately drop. As the voltage at $V_{OUT}$ 280 begins to drop, capacitor 242 reacts to the decrease in voltage and immediately begins supplying additional current to the current buffer amplifier 240. The rate of change in the voltage at $V_{OUT}$ 280 is converted to a current by the capacitor, and that current is transferred to the input of the current buffer amplifier 240. Current buffer amplifier 240 converts the current at its input to a voltage at its output with the output impedance at HIZ 212. The output of current buffer amplifier 240 is coupled to the input of buffer amplifier 220. Buffer amplifier 220 buffers that voltage and provides it to the control terminal of transistor 230 to drive transistor 230.

A potential stability problem can occur with the example system 200. Current buffer amplifier 240 and buffer amplifier 220 are each open loop amplifiers. Coupling capacitor 242 creates an uncontrolled amount of error signal in response to the decrease in voltage at $V_{OUT}$ 280. Therefore, the fast loop can become unstable and begin to oscillate under certain load conditions (e.g. full-load current and low output capacitance). A damping RC-network could be added to stabilize the fast loop by reducing its open loop gain, but that RC-network would slow down the response of the fast loop, adversely affecting the transient response.

Figure 3:
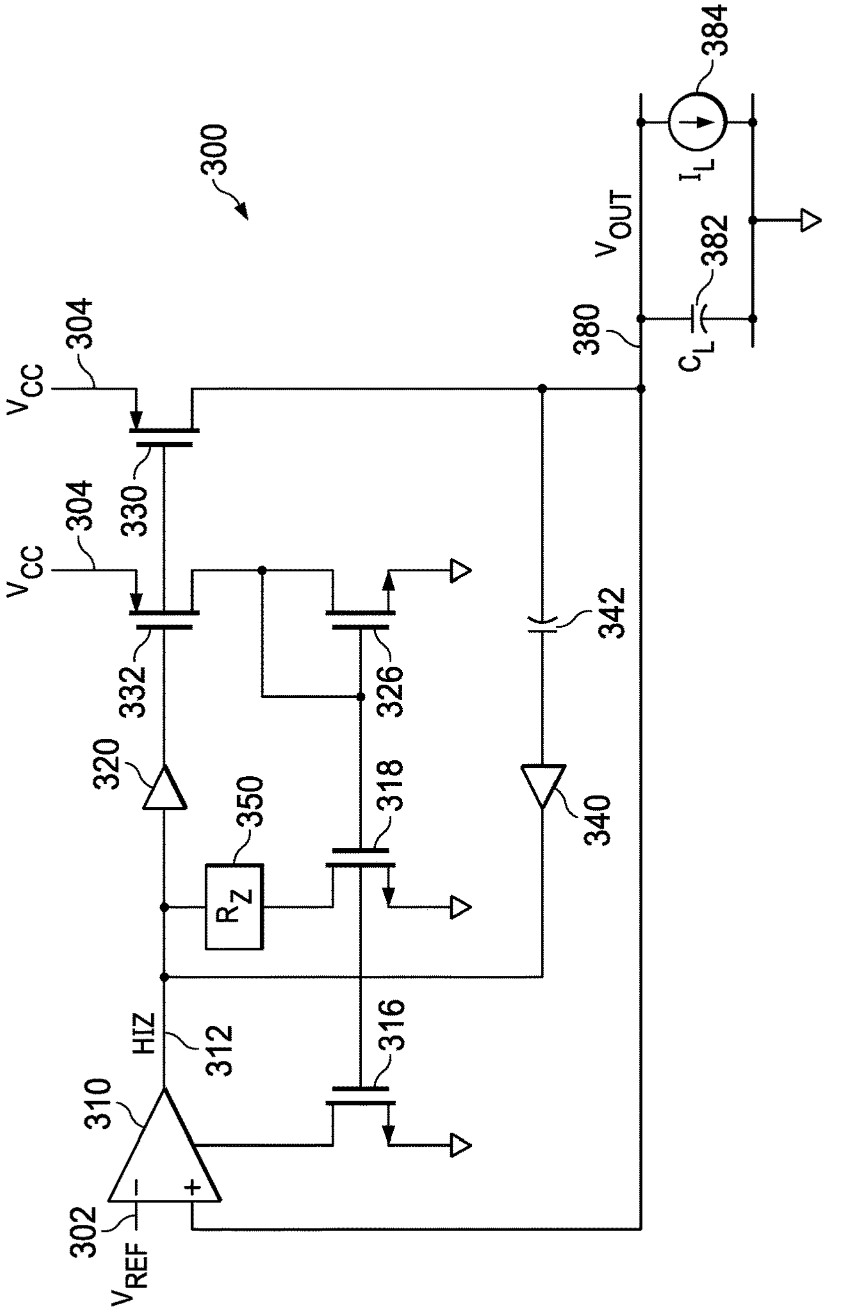
FIG. 3 shows a schematic diagram of an example circuit using adaptive biasing to reduce the inherent delays in mitigating the output voltage undershoot following a transient load disturbance.

FIG. 3 shows an example 300 using adaptive biasing to reduce the inherent delays in mitigating the output voltage undershoot following a transient load disturbance. Error amplifier 310 has first and second inputs and an output. The first input of error amplifier 310 receives a reference voltage $V_R$u 302. The second input of error amplifier 310 is coupled to the output terminal $V_{OUT}$ 380. The output of error amplifier 310 is high impedance node HIZ 312, which is coupled to the input of buffer amplifier 320.

The output of buffer amplifier 320 is coupled to the control terminal of transistor 332 and to the control terminal of transistor 330. The current terminals of transistor 330 are coupled between voltage supply terminal $V_{CC}$ 304 and the output terminal $V_{OUT}$ 380. A load capacitor $C_L$ 382 and a load current source $I_L$ 384 are coupled between the output terminal $V_{OUT}$ 380 and ground. The current terminals of transistor 332 are coupled between voltage supply terminal $V_{CC}$ 304 and transistor 326. The control terminal and first current terminal of transistor 326 are connected and coupled to a current terminal of transistor 332. The control terminal of transistor 326 is also connected to the control terminals of transistor 316 and transistor 318. The current terminals of transistor 316 are coupled between the biasing terminal of amplifier 310 and ground. The current terminals of transistor 318 are coupled between dynamic R-C network $R_Z$ 350 and ground. In at least one example, transistor 332 and transistor 330 are p-channel FETs (PFETs) while transistor 316, transistor 318 and transistor 326 are n-channel FETs (NFETs).

If the output current $I_L$ 384 is relatively small, and a large load is then suddenly connected to the output terminal $V_{OUT}$ 380, the voltage at $V_{OUT}$ 380 will immediately drop. Once the voltage at $V_{OUT}$ 380 begins to drop, coupling capacitor 342 reacts quickly by supplying current to the current buffer amplifier 340. The rate of change in the voltage at $V_{OUT}$ 380 is converted to a current by coupling capacitor 342, and that current is transferred to the input of the current buffer amplifier 340. Current buffer amplifier 340 converts the current to a voltage with the output impedance of amplifier 310 and dynamic R-C network $R_Z$ 350, and that voltage is input to the HIZ node 312. The output of current buffer amplifier 340 is coupled to the input of buffer amplifier 320. Buffer amplifier 320 buffers that voltage and provides it to the control terminals of transistor 332 and the control terminal of transistor 330.

Transistor 332 acts as a sense device indicating the current flowing through transistor 330. The voltage at HIZ node 312 and the control terminal of transistor 330 move in tandem with each other. Therefore, the current through transistor 332 is proportional to the current through transistor 330, and thus also proportional to the load current $I_L$ 384. Transistors 326 and 316 mirror the sensed current from transistor 332 into the bias terminal of amplifier 310. So, the biasing current of amplifier 310 increases as the load current increases, providing adaptive biasing. Transistors 316, 318, 326, 332 and 330 can each be a bipolar junction transistor or a FET.

The use of current buffer compensation improves the stability of the fast loop under a wide range of output loads. A first pole, an output pole, is created at $V_{OUT}$ 380 by the load capacitor and the resistance of the output load. The frequency of the output pole can move from the millihertz to Megahertz range over a large range of load currents and load capacitances. There is a second pole created at the HIZ node 312. A pole crossing can occur between the output pole and the HIZ pole as the output load changes. The current compensation circuit splits the poles on the HIZ node 312 and the output terminal $V_{OUT}$ 380 and stabilizes the system, preventing undesirable oscillations.

Figure 4:
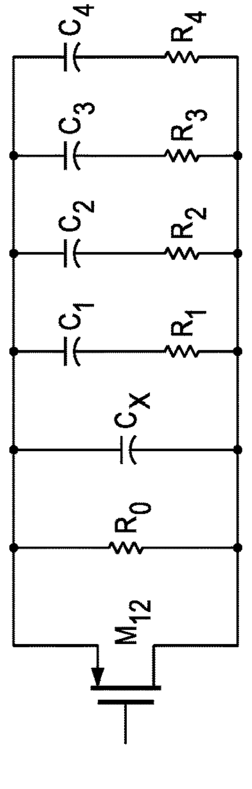
FIG. 4 shows an example of an R-C network that can be used for the R-C network.

FIG. 4 shows an example of an R-C network that can be used for the R-C network $R_Z$ 350. An R-C network is a ladder of resistors and capacitors forming consecutive poles and zeros. The locations of the poles and zeroes can be found by the following relationships:

$$\text{Zero}=Rx*Cx$$

$$\text{Pole}=R(1\|\ldots\|X)*C(X+1\|\ldots\|N)$$

When the output pole is the dominant pole, the R-C network $R_Z$ 350 is used to modify the HIZ pole into a half pole. With a half-pole, the gain falls at a rate of 10 dB/decade instead of by 20 dB/decade as it would with a pole. The output pole being dominant can occur when either the current load is light or the load capacitance is high. When the output pole is not the dominant pole, a third pole comes into play and the R-C network $R_Z$ 350 controls the damping factor. The impedance of the R-C network $R_Z$ 350 at any frequency determines the gain of the fast loop at that frequency.

R-C network $R_Z$ 350 has alternating poles and zeroes as the frequency increases. If the values of the resistors and capacitors in the ladder are chosen such that the poles cross well outside the bandwidth of the current buffer 340, the phase margin remains higher than zero and the amplifier will not become unstable. The phase margin should then be somewhere between 0 degrees and 90 degrees.

If R-C network $R_Z$ 350 is a passive network of resistors and capacitors only, the fast loop gain will remain constant for all load conditions. However, to maintain stability over a wide load range, the RC-network needs to cover a wide frequency range, in some cases 7-8 decades. This makes the R-C network quite large if only passive components are used. A large R-C network also loads the HIZ node, making the fast loop slower to react to a transient.

The R-C network can be made dynamic by using MOS-based resistors instead of fixed resistors. The biasing of the FET can be made to change with the load, thus making the FET resistance change with the load. By making the R-C network dynamic, the R-C network ladder can be modulated across the frequency range. Modulating an R-C ladder that covers a smaller frequency bandwidth across multiple frequency ranges allows a smaller ladder to be used, thus saving area. As the load increases, the impedance of the MOS-based resistors decreases, so the poles and zeroes move to higher frequencies (according to 1/RC), modulating the dynamic R-C ladder to higher frequency ranges. So, R-C network $R_Z$ 350 is made up of capacitors and MOS-based resistors that vary in resistance with biasing.

The gain of the fast loop is determined by the value of coupling capacitor 326, the gain of current buffer amplifier 340, the impedance at the HIZ node 312 including R-C network $R_Z$ 350, the gain of buffer amplifier 320 and the gain ($g_m$) of transistor 330. Higher impedance at the HIZ node 312 leads to higher gain of the fast loop, which leads to a faster reaction of the output regulation loop. The impedance at the HIZ node 312 is driven by the impedance of $R_Z$. When $R_Z$ is a dynamic R-C network, the impedance at HIZ 312 changes with the load current $I_L$ 384. For lower loads, $R_Z$ will increase, making the gain of the fast loop higher. For higher loads, $R_Z$ will decrease, making the gain of the fast loop lower. The fast loop decides the transient response until adaptive biasing kicks in and the amplifier 310 takes control of the regulator.

The dynamic R-C network 350 improves the transient response by increasing the impedance at HIZ 312 at light loads, making the gain of the fast loop higher to end the voltage undershoot at $V_{OUT}$ 380 more quickly following a load transient. Subsequently, the current through transistor 330 increases, causing the current through transistor 318 to increase, allowing the voltage at $V_{OUT}$ 380 to increase recovering from the load transient. The impedance of the dynamic R-C network 350 decreases in response to the voltage at $V_{OUT}$ 380 recovering, increasing the frequency band of the R-C network poles to higher frequencies.

So, if there is initially a light load current demand, the gain of the fast loop will be high and the quiescent current IQ will be low. This results in good power efficiency and stable operation across all ranges of $C_L$. If then a load transient occurs and the load current must rapidly increase, the voltage at $V_{OUT}$ will immediately drop. The gain of the fast loop will be high initially so that the drop in $V_{OUT}$ can be mitigated as quickly as possible. Subsequently, the gain of the fast loop will begin to decrease as the voltage at $V_{OUT}$ 380 begins to recover and the adaptive bias builds up in the loop. Once, the load current reaches its maximum value and $V_{OUT}$ returns to its nominal value, the gain of the fast loop remains low, and the circuit will be stable.

There are two modifications to circuit 300 that can bring improvements to the transient output voltage response when a higher load is suddenly connected. As the voltage at $V_{OUT}$ increases and approaches it nominal value, the adaptive bias builds up in the loop and reduces the resistance in dynamic R-C network 350 and the impedance at HIZ 312. As a result, the gain of the fast loop will decrease proportionately from the high gain state it initially went to following the transient. The first modification to circuit 300 is to hold the gain of the fast loop higher for a longer period of time following the initial load transient instead of immediately decreasing the gain of the fast loop as the adaptive current builds up. Holding the fast loop gain high for a longer period can allow the voltage drop at $V_{OUT}$ to be remedied more quickly by allowing the rate of voltage increase for $V_{OUT}$ to remain higher for a longer time.

The second modification to circuit 300 that can bring improvements to the transient output voltage response is to further increase the impedance at HIZ 312 during light load conditions, causing a higher initial gain in the fast loop. The impedance at HIZ can be increased by adding an offset current at the input to $R_Z$ 350.

Figure 5:
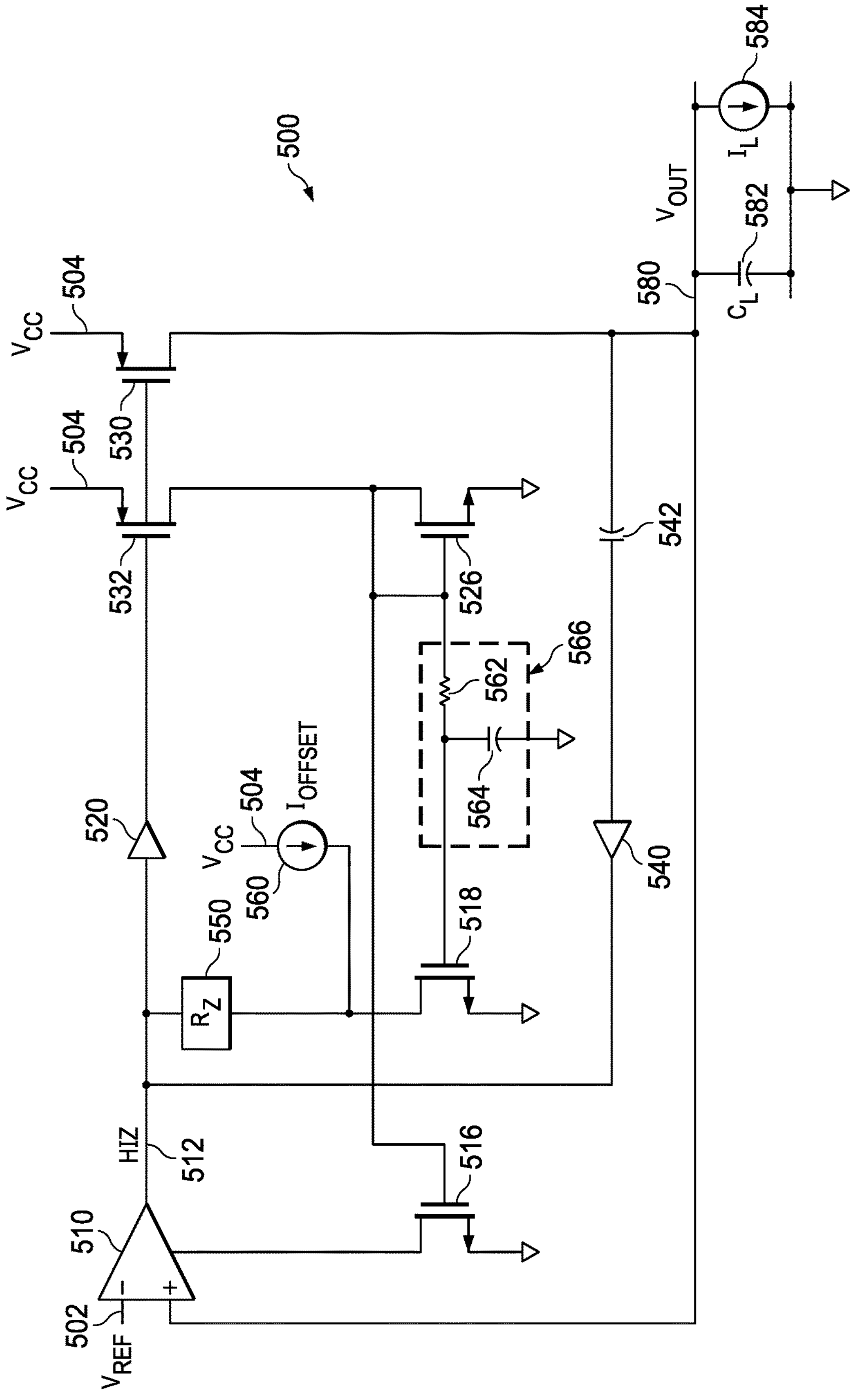
FIG. 5 shows a schematic diagram for an example circuit with adaptive biasing having an offset current source and a delay element to prolong the period of high gain in the fast loop.

FIG. 5 shows an example 500 of a circuit with adaptive biasing having an offset current source $L_{offset}$ 560, and a delay element 566 to prolong the period of high gain in the fast loop. Error amplifier 510 has first and second inputs and an output. The first input of error amplifier 510 receives a reference voltage $V_{REF}$ 502. In at least one example, $V_{REF}$ 502 is an internal voltage reference supplied by a bandgap reference and a voltage scaling amplifier. The second input of error amplifier 510 is coupled to the output terminal $V_{OUT}$ 580. The output of error amplifier 510 is high impedance node HIZ 512, which is coupled to the input of buffer amplifier 520.

The output of buffer amplifier 520 is coupled to the control terminal of transistor 532 and to the control terminal of transistor 530. The current terminals of transistor 530 are coupled between voltage supply terminal $V_{CC}$ 504 and the output terminal $V_{OUT}$ 580. A load capacitor $C_L$ 582 and a load current source $I_L$ 584 are coupled between the output terminal $V_{OUT}$ 580 and ground. The current terminals of transistor 532 are coupled between voltage supply terminal $V_{CC}$ 504 and transistor 526. The control terminal and first current terminal of transistor 526 are connected to a current terminal of transistor 532.

The control terminal of transistor 526 is also connected to the control terminal of transistor 516. The current terminals of transistor 516 are coupled between the bias terminal of amplifier 510 and ground. The current terminals of transistor 518 are coupled between dynamic R-C network $R_Z$ 550 and ground. Dynamic R-C network $R_Z$ 550 is made up of capacitors and MOS-based resistors that vary in resistance with biasing.

Resistor 562 is coupled between the control terminal of transistor 526 and the control terminal of transistor 518. Capacitor 564 is coupled between the control terminal of transistor 518 and ground. Resistor 562 and capacitor 564 make up delay element 566. The delay element 566 causes a delay in the decrease of the impedance of dynamic R-C network $R_Z$ 550 as the adaptive current is built up and the voltage at $V_{OUT}$ 580 recovers and rises from its initial drop following a transient load increase. In at least one example, transistor 532 and transistor 530 are PFETs while transistor 516, transistor 518 and transistor 526 are NFETs.

As the voltage at $V_{OUT}$ 580 increases and the adaptive current is built up, the delay element 566 delays the response of transistor 518, which delays the response of dynamic R-C network $R_Z$ 550 to the increase in voltage at $V_{OUT}$ 580. Due to the delay brought by delay element 566, the impedance of dynamic R-C network $R_Z$ 550 will remain higher for a longer period instead of immediately decreasing as $V_{OUT}$ 580 increases. The impedance of dynamic R-C network $R_Z$ 550 remaining higher for a longer period before decreasing causes the voltage at the input to amplifier 520 to remain higher for a longer period. The output of amplifier 520 remaining higher for longer causes transistor 530 to remain turned on for a longer period, causing more current to be delivered through transistor 530. More current being delivered through transistor 530 causes the voltage at $V_{OUT}$ 580 to increase more quickly and recover to its nominal value.

Offset current source $I_{offset}$ 560 is coupled between $V_{CC}$ 504 and dynamic R-C network $R_Z$ 550. The bias current flowing into dynamic R-C network $R_Z$ 550 is the sum of the adaptive current from transistor 518 and the offset current from offset current source $I_{offset}$ 560. Offset current from offset current source $I_{offset}$ 560 is opposite in polarity to the adaptive current flowing from transistor 518 to dynamic R-C network $R_Z$ 550. The offset current from offset current source $I_{offset}$ 560 offsets the adaptive current from transistor 518 and reduces the total bias current flowing into dynamic R-C network $R_Z$ 550.

The bias current supplied to dynamic R-C network $R_Z$ 550 determines the resistance of the MOS-based resistors in the dynamic R-C network $R_Z$ 550. When the bias current supplied to dynamic R-C network $R_Z$ 550 is lower, the resistance of the MOS-based resistors in the dynamic R-C network $R_Z$ 550 is higher. Having a higher resistance of the MOS-based resistors in the dynamic R-C network $R_Z$ 550 provides a higher impedance at HIZ 512, which increases the gain of the fast loop and improves the transient response.

Figure 6:
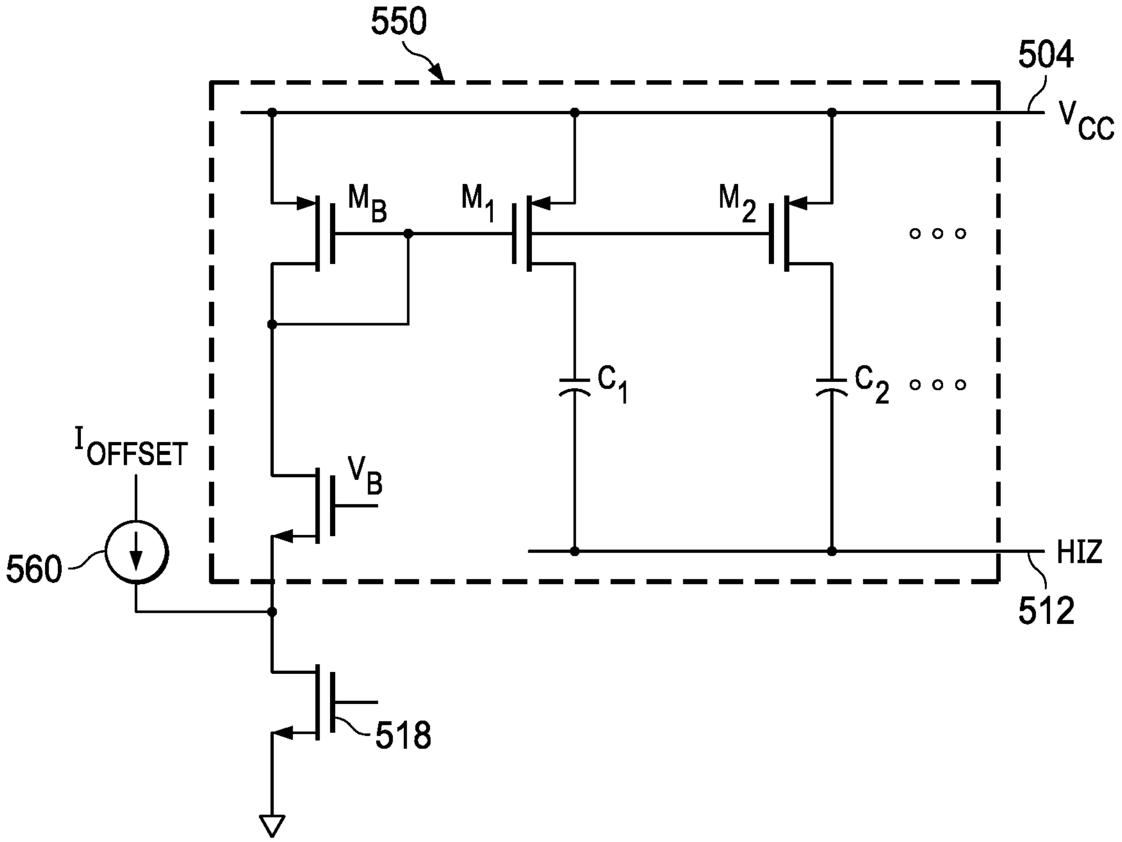
FIG. 6 shows a schematic of an example embodiment for a dynamic R-C network.

FIG. 6 shows an example embodiment of dynamic R-C network $R_Z$ 550. Offset current from $L_{offset}$ 560 is combined with the adaptive bias current from transistor 518 to provide the bias current to dynamic R-C network $R_Z$ 550. The bias current flows into a first transistor having a constant gate bias source VB allowing it to pass the bias current on to a current terminal and control terminal of bias FET MB. The bias current is also provided to the control terminals of the MOS-based resistors ($M_1$, $M_2$, . . . ) in the dynamic R-C network $R_Z$ 550. Each MOS-based resistor is connected in series with a corresponding capacitor, and each series MOS-based resistor-capacitor combination is connected in parallel with the other MOS-based resistor-capacitor series combinations between $V_{CC}$ 504 and HIZ 512.

At no-load or at very light loads, the change in bias current supplied to dynamic R-C network $R_Z$ 550 can be significant, while the change in bias current supplied to dynamic R-C network $R_Z$ 550 at full load may be negligible. For instance, in one example system, the range of adaptive current supplied by transistor 518 may range from 125 nA at no-load to 4 uA at full load. An example offset current supplied by $L_{offset}$ 560 could be 60 nA. In this case, the bias current supplied to dynamic R-C network $R_Z$ 550 is reduced by nearly half at no-load, being reduced from 125 nA to 65 nA by the 60 nA offset current. However, at full load, the bias current supplied to dynamic R-C network $R_Z$ 550 is 4 uA minus 60 nA, which is a negligible reduction in current, so the full-load performance is not compromised. The constant offset current $I_{offset}$ 560 significantly changes the current supplied to dynamic R-C network $R_Z$ 550 only in the no-load state, not in the full load state. Thus, the transient response is improved.

As used herein, the terms "terminal", "node", "interconnection", "lead" and "pin" are used interchangeably. Unless specifically stated to the contrary, these terms are generally used to mean an interconnection between or a terminus of a device element, a circuit element, an integrated circuit, a device, or other electronics or semiconductor component.

Uses of the phrase "ground" in the foregoing description include a chassis ground, an Earth ground, a floating ground, a virtual ground, a digital ground, a common ground, and/or any other form of ground connection applicable to, or suitable for, the teachings of this description.

In this description, even if operations are described in a particular order, some operations may be optional, and the operations are not necessarily required to be performed in that particular order to achieve desirable results. In some examples, multitasking and parallel processing may be advantageous. Moreover, a separation of various system components in the embodiments described above does not necessarily require such separation in all embodiments.

Modifications are possible in the described embodiments, and other embodiments are possible, within the scope of the claims.

What is claimed is:

1. A voltage regulator circuit comprising:

a first amplifier having first and second amplifier inputs, a bias terminal and a first amplifier output, wherein the first amplifier input is coupled to a voltage reference, and the second amplifier input is coupled to an output voltage terminal;

a first transistor having first and second transistor current terminals and a first control terminal, wherein the first transistor current terminal is coupled to a supply voltage terminal, and the first control terminal is coupled to the first amplifier output;

a second transistor having third and fourth transistor current terminals and a second control terminal, wherein the third transistor current terminal is coupled to the supply voltage terminal, the second control terminal is coupled to the first control terminal, and the fourth transistor current terminal is coupled to the output voltage terminal;

a third transistor having fifth and sixth transistor current terminals and a third control terminal, wherein the fifth transistor current terminal and the third control terminal are coupled to the second transistor current terminal, and the sixth transistor current terminal is coupled to a ground terminal;

a fourth transistor having seventh and eighth transistor current terminals and a fourth control terminal, wherein the fourth control terminal is coupled to the third control terminal, and the eighth transistor current terminal is coupled to the ground terminal;

a fifth transistor having ninth and tenth transistor current terminals and a fifth control terminal, wherein the ninth transistor current terminal is coupled to the bias terminal of the first amplifier, the fifth control terminal is coupled to the third control terminal, and the tenth transistor current terminal is coupled to the ground terminal;

a dynamic R-C network coupled between the first amplifier output and the seventh transistor current terminal; and a buffer having a buffer input and a buffer output, wherein the buffer input is coupled to the output voltage terminal.

2. The voltage regulator circuit of claim 1, further comprising:

a capacitor coupled between the fourth control terminal and the ground terminal; and a resistor coupled between the third control terminal and the fourth control terminal.

3. The voltage regulator circuit of claim 1, including a current source coupled between the supply voltage terminal and the seventh transistor current terminal.

4. The voltage regulator circuit of claim 3, wherein a current provided to the dynamic R-C network by the current source is opposite in polarity to a current provided to the dynamic R-C network by the fourth transistor.

5. The voltage regulator circuit of claim 1, further comprising a capacitor coupled between the buffer input and the output voltage terminal.

6. The voltage regulator circuit of claim 1, wherein the dynamic R-C network includes a series resistor-capacitor combination in parallel with at least one other series resistor-capacitor combination.

7. The voltage regulator circuit of claim 1, wherein the first and second transistors are PFETs, and the third, fourth and fifth transistors are NFETs.

8. The voltage regulator circuit of claim 1, wherein a current through the fifth transistor is equal to a current through the third transistor.

9. A method of improving transient response in a voltage regulator comprising:

providing a regulated supply at a voltage regulator output;

providing a current signal proportional to a difference in a voltage at the voltage regulator output between a no-load state and a loaded state of the voltage regulator output;

providing the current signal to an input of a dynamic impedance network, wherein the dynamic impedance network has a dynamic impedance that is controlled by a bias current;

providing a drive voltage at an output of the dynamic impedance network;

increasing a drive current provided to the voltage regulator output using a drive transistor;

adaptively reducing the dynamic impedance as the voltage at the voltage regulator output increases; and holding the dynamic impedance at a value responsive to the voltage at the voltage regulator output reaching a particular value.

10. The method of claim 9, in which a delay element provides a time delay prior to reducing the dynamic impedance as the voltage at the voltage regulator output increases.

11. The method of claim 10, in which the delay element includes a resistor and a capacitor.

12. The method of claim 9, in which the dynamic impedance is dynamically adjusted to maintain regulator stability at varying load current levels.

13. The method of claim 9, in which increasing the bias current reduces the dynamic impedance.

14. A system comprising:

an electrical load;

an output voltage terminal coupled to the electrical load;

a first amplifier having first and second amplifier inputs, a bias terminal and a first amplifier output, wherein the first amplifier input is coupled to a voltage reference, and the second amplifier input is coupled to the output voltage terminal;

a first transistor coupled to a supply voltage terminal and having a first control terminal, wherein the first control terminal is coupled to the first amplifier output;

a second transistor coupled between the supply voltage terminal and the output voltage terminal and having a second control terminal, wherein the second control terminal is coupled to the first control terminal;

a third transistor coupled between the first transistor and a ground terminal and having a third control terminal, wherein the third control terminal is coupled to the first transistor;

a fourth transistor coupled between an offset current terminal and the ground terminal and having a fourth control terminal, wherein the fourth control terminal is coupled to the third control terminal;

a fifth transistor coupled between the bias terminal and the ground terminal and having a fifth control terminal, wherein the fifth control terminal is coupled to the third control terminal;

a dynamic R-C network coupled between the first amplifier output and the fourth transistor; and a buffer having a buffer input and a buffer output, wherein the buffer input is coupled to the output voltage terminal.

15. The system of claim 14, further comprising:

a capacitor coupled between the fourth control terminal and the ground terminal; and a resistor coupled between the third control terminal and the fourth control terminal.

16. The system of claim 14, including a current source coupled between the supply voltage terminal and the offset current terminal.

17. The system of claim 16, wherein a current provided to the dynamic R-C network by the current source is opposite in polarity to a current provided to the dynamic R-C network by the fourth transistor.

18. The system of claim 14, wherein a current supplied to the dynamic R-C network determines a resistance of resistors in the dynamic R-C network.

19. The system of claim 14, wherein the dynamic R-C network includes a series resistor-capacitor combination in parallel with at least one other series resistor-capacitor combination.

20. The system of claim 14, wherein the first and second transistors are PFETs, and the third, fourth and fifth transistors are NFETs.

* * * * *